March 5, 1929.   J. H. FLANNERY   1,704,662
BOLSTER FOR TANK VEHICLES
Filed Nov. 4, 1925   2 Sheets-Sheet 1
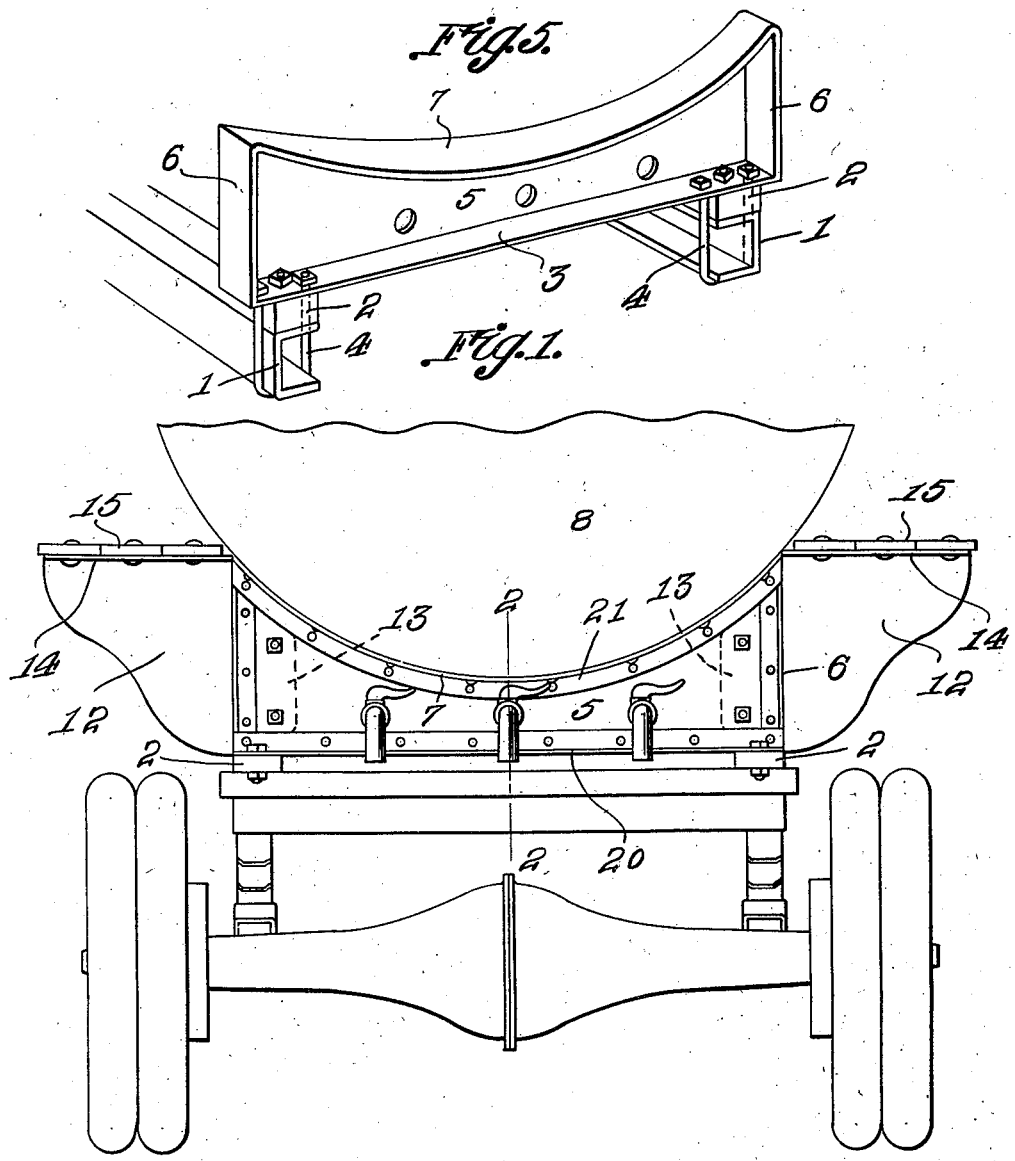

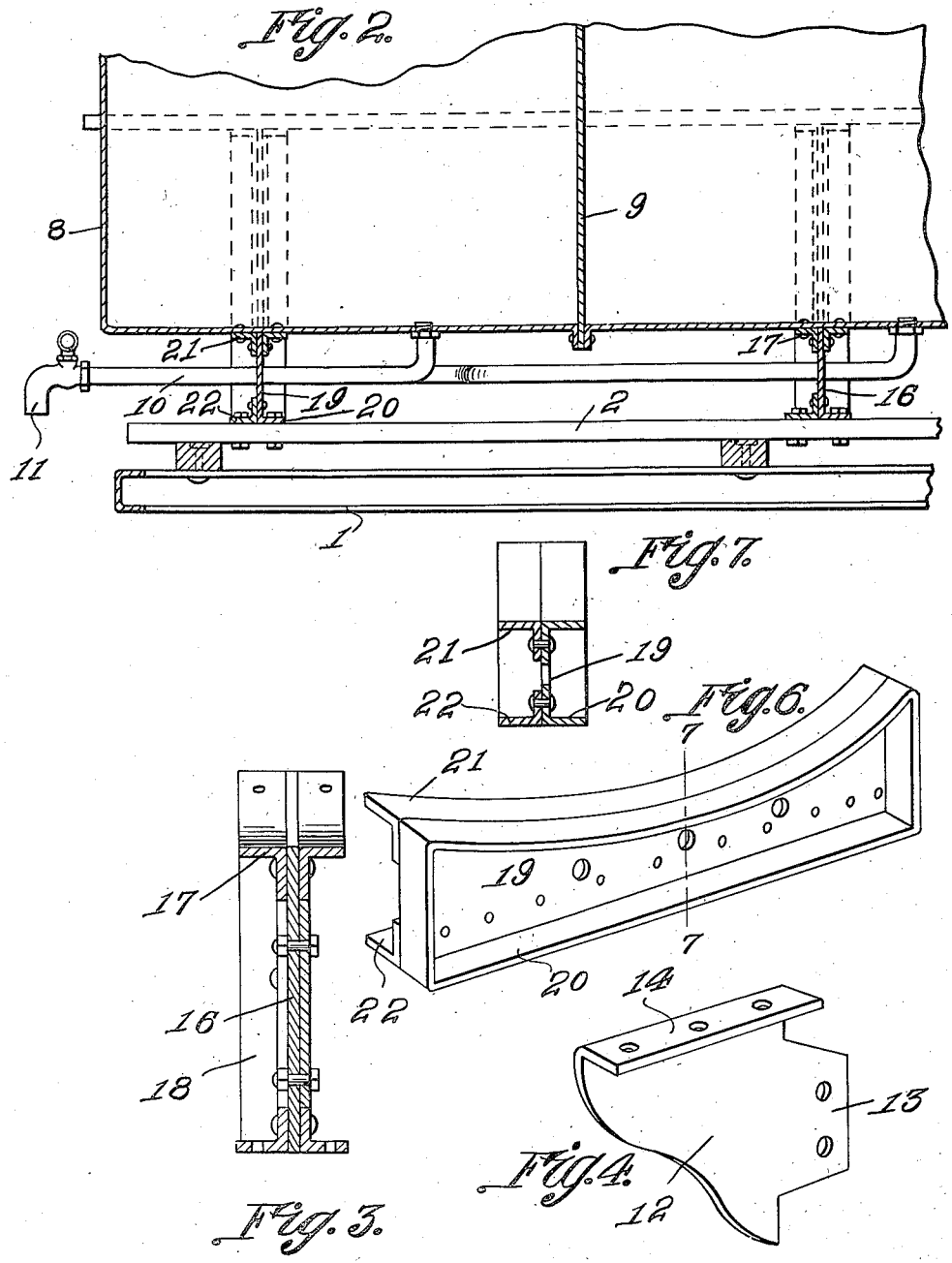

Patented Mar. 5, 1929.

1,704,662

UNITED STATES PATENT OFFICE.

JAMES HARRIS FLANNERY, OF KANSAS CITY, MISSOURI.

BOLSTER FOR TANK VEHICLES.

Application filed November 4, 1925. Serial No. 66,814.

My present invention has reference to improvements in the construction of tank trucks, such as is commonly employed in vending fluids such as oils and gasoline.

My object is to simplify and improve the existing art by producing a truck for tanks that has bolsters of a particular and peculiar construction to which the truck tank is welded or riveted to produce a unitary structure between these elements which will successfully resist any shocks or jars to which the device is subjected and which will obviate the employment of the straps or bands which are generally employed in securing the tank to the bolsters.

A still further object is the construction of metal bolsters for tanks which include each a central web flanged in opposite directions, the upper flange being bowed downwardly to receive and to conform to the shape of the tank that rests and is secured thereon, the end and bottom flanges reinforcing the bolster, and the bolsters being further reinforced as well as held in proper spaced relation by pipe members that are fixed on the webs of the said bolsters and are directed to the several compartments of the tank.

A still further object is the provision of a bolster support for wheeled liquid distributing tanks, in which the bolsters may be cheaply constructed in a novel manner to provide an ample support for the tank and to which bolsters the tank is rigidly secured and wherein there is fixed on the sides of the bolsters brackets of a novel construction that serve as supports for the racks on which the measuring cans rest.

To the attainment of the above broadly stated objects and others which will appear as the nature of the invention is better understood, the improvement further resides in certain details of construction, combination and operative association of parts, a satisfactory embodiment of which is illustrated by the accompanying drawings.

In the drawings:

Figure 1 is a partial rear elevation illustrating the improvement.

Figure 2 is a sectional view approximately on the line 2—2 of Figure 1.

Figure 3 is an enlarged transverse sectional view through one form of bolster.

Figure 4 is a perspective view of one of the brackets employed.

Figure 5 is a perspective view illustrating a second form of bolster.

Figure 6 is a similar view illustrating another form of bolster.

Figure 7 is a sectional view approximately on the line 7—7 of Figure 6.

The channeled side members of the frame or chassis of the wheeled truck of a liquid conveying and dispensing tank are indicated, in the drawings, by the numeral 1. As the running gear and the remainder of the truck frame do not form part of this invention, reference thereto is not believed necessary. On the channeled members 1 I arrange longitudinally extending wooden beams 2, and resting directly upon the beams 2 there is the lower flanged portion 3 of the improved form of bolster. The flange 3 is bolted to the beams or sills 2 and is connected to the channeled members 1 through the medium of U-bolts 4. The nuts which engage the U-bolts rest on the flange 3, which is true with respect to the nut that secures the sills on the channel members 1 and on the flange 3.

The web of the bolster is indicated by the numeral 5, and the bolster is provided with side flanges 6 and with a top flange 7 which extend laterally from the web 1, when the bolster is formed of a single metal casting. The top flange 7 is bowed or arched downwardly from the ends to the center thereof and on this flange there rests and is secured the bottom portion of the tank 8. The tank is divided into any desired number of compartments, and of course, any desired number of bolsters are employed. The tank may be welded, riveted or otherwise securely fixed on the bolsters. The tank is also preferably divided by partitions 9 into a plurality of compartments and there is extended through the webs of the bolsters pipe members 10 that have angle branches which communicate with the respective compartments in the tank. The pipes lead to the rear of the vehicle and have screwed on their outlets faucets 11. It is to be understood that the pipes 10 are fixedly secured on the bolsters and are, of course, likewise secured on the tank. Thus the pipe members serve to reinforce the bolsters, hold the same in proper spaced relation and likewise have a tendency to hold the tank seated on the bolsters.

In carrying out my improvement I aim to provide a simple means whereby platforms or racks for supporting the measuring cans may rest. To accomplish this I employ brackets illustrated in Figures 1 and 4 of the drawings. Each bracket includes a plate 12 whose outer edge is curved or rounded from its top to its bottom and whose inner edge is formed with an extension 13. The reduced extension is designed to be received through one end of the bolster and to be bolted or otherwise fixedly secured to the web of the bolsters. The upper straight end of the bracket plate 12 is formed with an angle flange 14. This flange, together with the inner edge of the plate proper, contacts with the ends of the bolsters. The flange is provided with any desired number of spaced openings for the reception of securing elements for the boards 15 that constitute the shelves or racks.

It is, of course, within the province of this invention to construct metal bolsters in various manners to suit varying conditions and cheapness and efficiency in manufacture. Therefore, and as illustrated in Figure 3 of the drawings, the central plate or web 16 of the bolster is not provided with the top, bottom and end flanges, but such flanges are in the nature of angle plates 17 which are riveted to the web plate 16. In this instance, the reduced extension or tongue 13 of the brackets 12 are received between the upper and lower angle plates 17, and contact with the edges thereof and are bolted directly to the web plate 16. Also if desired, filler blocks 18 may be arranged between the upper and lower angle members at the ends of the bolsters.

In Figures 6 and 7 of the drawings the web 19 is formed upon one edge of a bolster section 20. The bolster section has its top, bottom and its ends provided with a continuous outstanding flange and riveted to the opposite face of the said web plate 19 there are angle plates comprising the concaved top 21 of the bolster and the straight bottom 22 of said bolster. The angle plates 21 and 22 are of course rigidly secured to the web 19, and the tongues 13 of the bracket plates 12 are received between and contact with the confronting edges of the vertical flanges of the angle plates 21 and 22 and are riveted, bolted or otherwise secured to the web plate 19.

Having described the invention, I claim:—

Supporting bolsters for the tank of a liquid dispensing tank wagon, each comprising a metal member which includes a central web plate whose upper face is concaved to receive the tank therein, and top and bottom angle plates secured to the web plate, the upper angle plates having their outstanding flanges concaved and bolted to the tank, and brackets having their inner edges provided with reduced tongue portions which are received between the confronting edges of the angle flanges to contact therewith and which are riveted or otherwise secured to the web plate.

In testimony whereof I affix my signature.

JAMES HARRIS FLANNERY.